(12) United States Patent
Yap et al.

(10) Patent No.: US 9,503,256 B2
(45) Date of Patent: Nov. 22, 2016

(54) SMS4 ACCELERATION HARDWARE

(71) Applicant: Intel Corporation, Santa Clara, CA (US)

(72) Inventors: Kirk Yap, Westborough, MA (US); Gilbert Wolrich, Framingham, MA (US); Sudhir Satpathy, Hillsboro, OR (US); Sean Gulley, Boston, MA (US); Vinodh Gopal, Westborough, MA (US); Sanu Mathew, Hillsboro, OR (US); Wajdi Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,707

(22) Filed: Dec. 24, 2014

(65) Prior Publication Data

US 2016/0191238 A1    Jun. 30, 2016

(51) Int. Cl.
*H04L 9/00* (2006.01)
*H04L 9/08* (2006.01)
*H04L 9/14* (2006.01)

(52) U.S. Cl.
CPC ............... *H04L 9/0822* (2013.01); *H04L 9/14* (2013.01)

(58) Field of Classification Search
CPC ........................................................ H04L 9/14
USPC ........................................................ 380/44
See application file for complete search history.

(56) References Cited

U.S. PATENT DOCUMENTS

| | | | | |
|---|---|---|---|---|
| 7,561,689 B2 * | 7/2009 | Avasarala | ............. | H04L 9/0631 380/28 |
| 8,204,218 B2 * | 6/2012 | Lu | .......... | H04L 9/0625 380/28 |
| 8,538,015 B2 * | 9/2013 | Gueron | ............... | G06F 12/0875 380/28 |
| 2009/0052659 A1 * | 2/2009 | Gueron | ................. | H04L 9/0631 380/29 |
| 2009/0323930 A1 * | 12/2009 | Lu | .......... | H04L 9/0625 380/28 |

* cited by examiner

*Primary Examiner* — Longbit Chai
(74) *Attorney, Agent, or Firm* — Thomas R. Lane

(57) ABSTRACT

Embodiments of an invention for SMS4 acceleration hardware are disclosed. In an embodiment, an apparatus includes SMS4 hardware and key transformation hardware. The SMS4 hardware is to execute a round of encryption and a round of key expansion. The key transformation hardware is to transform a key to provide for the SMS4 hardware to execute a round of decryption.

20 Claims, 7 Drawing Sheets

METHOD 500

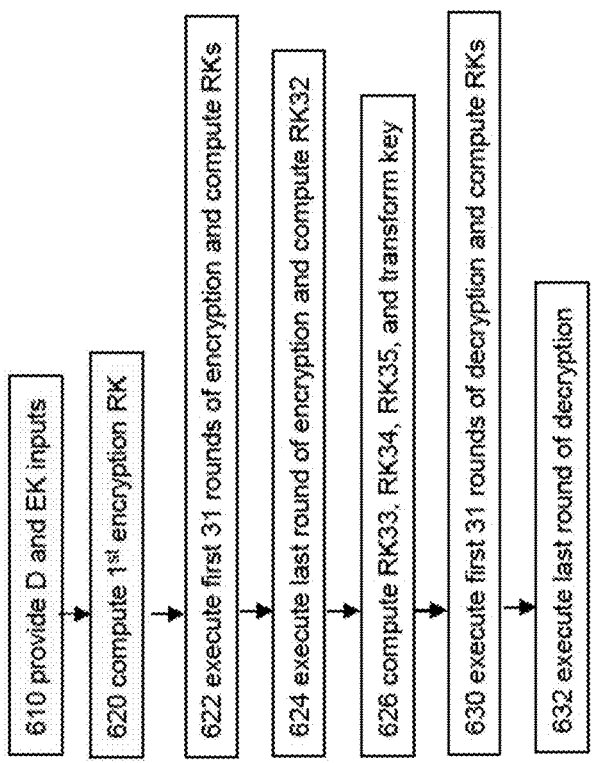

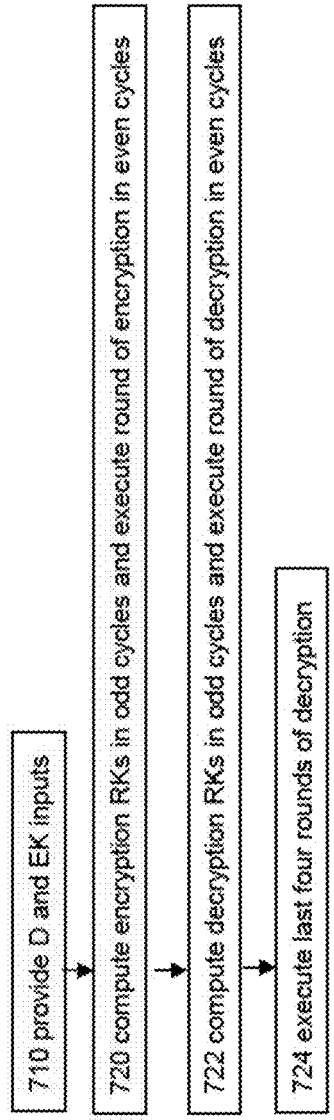

SMS4 ACCELERATION HARDWARE

BACKGROUND

Technical Field

Embodiments described herein generally relate to processors. In particular, embodiments described herein generally relate to performing cryptography in processors.

Background Information

Cryptography is a technology often used to protect confidential or secret information in computer systems and other electronic devices. Cryptography generally involves using a cryptographic algorithm and a cryptographic key to protect information. For example, encryption (sometimes referred to as cipher) may be performed in which a series of transformations or operations as specified by the cryptographic algorithm are performed on unencrypted or plaintext input data (e.g., a string of bits representing text, numbers, intelligible characters, etc.) using an encryption key (e.g., a string of bits) to produce encrypted data. The encrypted data is also sometimes referred to as cipher text or cipher data. The encrypted data is generally unintelligible. It is generally not possible, or at least not practically feasible, to determine the unencrypted plaintext data from the encrypted data, without knowing the cryptographic key. If the cryptographic key is known, decryption (sometimes referred to as inverse cipher) may be performed on the encrypted data to reproduce the corresponding plaintext or unencrypted data. The transformations or operations performed during decryption may be substantially the reverse of those performed during encryption.

SMS4 is a cryptographic algorithm approved by the Chinese government for use in wireless networks. SMS4 is also known as SM4. The SMS4 cryptographic algorithm is a block cipher algorithm. The input data (also referred to as state), output data, and cryptographic key are each 128-bits. Encryption of data is performed through thirty-two rounds. Each round involves a number of different operations or transformations that are used to transform the input data into the encrypted data. Thirty-two rounds with similar transformations are used to decrypt data. There are also thirty-two rounds for key expansion in which round keys for the different encryption and decryption rounds are generated. Further details of the SMS4 cryptographic algorithm, if desired, are available in the document "SM4 Encryption Algorithm for Wireless Networks," translated and typeset by Whitfield Diffie of Sun Microsystems and George Ledin of Sonoma State University, 15 May 2008, Version 1.03.

BRIEF DESCRIPTION OF THE DRAWINGS

The invention may best be understood by referring to the following description and accompanying drawings that are used to illustrate embodiments. In the drawings:

FIGS. 5, 6, and 7 illustrate embodiments of the present invention in methods for performing an SMS4 cryptographic algorithm.

DETAILED DESCRIPTION OF EMBODIMENTS

Figure 1:
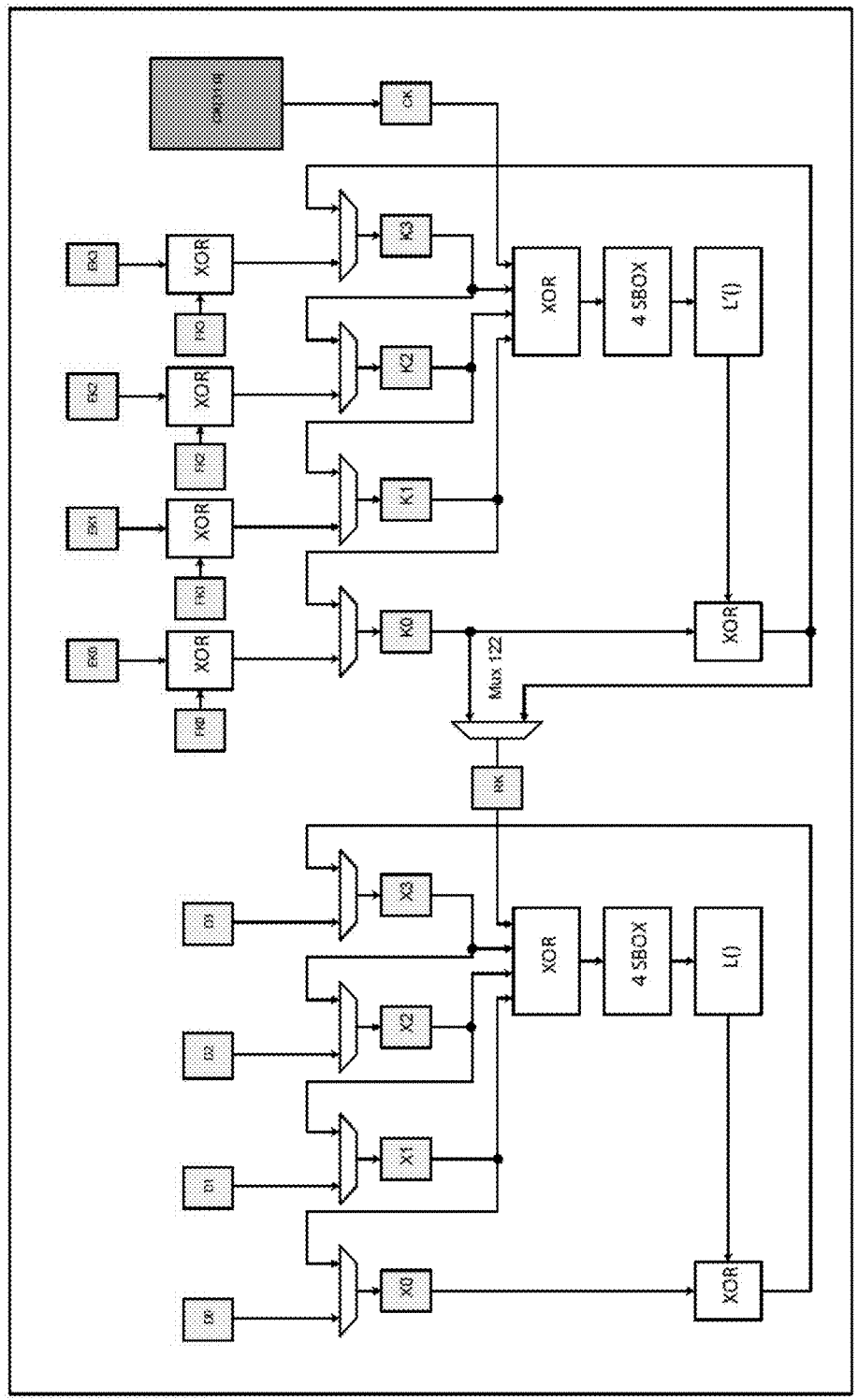
FIG. 1 illustrates an embodiment of the present invention in SMS4 acceleration hardware.

Disclosed herein are embodiments of an invention for SMS4 acceleration hardware. In the following description, numerous specific details are set forth (e.g., processor configurations, microarchitectural details, sequences of operations, etc.). However, embodiments may be practiced without these specific details. In other instances, well-known circuits, structures and techniques have not been shown in detail to avoid obscuring the understanding of the description.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, as used in descriptions of embodiments of the present invention, a "/" character between terms may mean that an embodiment may include or be implemented using, with, and/or according to the first term and/or the second term (and/or any other additional terms).

Execution of an SMS4 cryptographic algorithm in a processor or other apparatus tends to be computationally intensive. Therefore, the use of acceleration hardware according to embodiments of the present invention may be desired for improved performance.

During cipher (e.g., encryption and decryption), the SMS4 algorithm uses a round function (F), as shown in Equation 1:

$$X_{i+4} = F(X_i, X_{i+1}, X_{i+2}, X_{i+3}, rk_i) \qquad \text{Equation 1}$$
$$= X_i XORT(X_{i+1} XOR X_{i+2} XOR X_{i+3} XOR rk_i)$$

The symbol "XOR" represents a bitwise exclusive OR (XOR) operation. The terms $X_i$ represents a 32-bit piece of state for round i, $X_{i+1}$ represents a 32-bit piece of state for round (i+1), etc. The term $rk_i$ represents a 32-bit round key for round i. Initially, a 128-bit input block (e.g., 128-bits of plaintext data to be encrypted) may be designated as four 32-bit elements ($X_0$, $X_1$, $X_2$, $X_3$). These elements may be arranged in big endian order. The round function (F) is used to perform thirty-two rounds (e.g., for i=0, 1, . . . 31). Representatively, during the first round, a 32-bit result $X_4$ may be determined by evaluating $F(X_0, X_1, X_2, X_3, rk_0)$. After thirty-two rounds of encryption, ($X_{28}$, $X_{29}$, $X_{30}$, $X_{31}$) represents 128-bits of encrypted data corresponding to the 128-bit input block ($X_0$, $X_1$, $X_2$, $X_3$).

Notice that Equation 1 has a function T(x). T(x) is known as the mixer-substitution function. T(x) generates a 32-bit output from a 32-bit input. As shown in Equation 2, the mixer-substitution function T(x) includes two substitution functions:

$$T(x)=L(\tau(x)) \qquad \text{Equation 2}$$

The function $\tau(x)$ is a "non-linear substitution" function. The function L(B) is a "linear substitution" function.

Equation 3 represents the operation of the non-linear substitution function τ(x):

$$\tau(x)=(Sbox(a_0),Sbox(a_1),Sbox(a_2),Sbox(a_3)) \quad \text{Equation 3}$$

τ(x) applies a substitution box (Sbox) to a 32-bit input value x. The 32-bit value x may be logically partitioned into four 8-bit segments or bytes $a_0$, $a_1$, $a_2$, and $a_3$. Each of $a_0$, $a_1$, $a_2$, and $a_3$ may be passed through the Sbox. The Sbox may take the associated 8-bit segment as an input, perform a non-linear substitution on the input 8-bit segment to generate a replacement or substitute 8-bit segment, and output the replacement or substitute 8-bit segment. By way of example, the Sbox may be implemented as a fixed lookup table. The input 8-bit segment may be used to lookup the corresponding output 8-bit segment in the lookup table. For example, one part of the input 8-bit segment may select a row, another part of the input 8-bit segment may select a column, and the selected row and selected column may identify a byte to be used as the output byte. The four output 8-bit segments may be concatenated to produce a 32-bit value B. The 32-bit value B may represent four concatenated 8-bit segments ($b_0$, $b_1$, $b_2$, $b_3$). The relation between B and τ(x) is shown by Equation 4:

$$B=(b_0,b_1,b_2,b_3)=\tau(x) \quad \text{Equation 4}$$

As shown in Equation 2, the linear substitution function L(B) may be performed on the 32-bit result B of the non-linear substitution function τ(x). The linear substitution function L(B), which is used for encryption and/or decryption, is shown in Equation 5:

$$L(B)=B\ XOR(B<<<2)XOR(B<<<10)XOR(B<<<18) \\ XOR(B<<<24) \quad \text{Equation 5}$$

The symbol "<<<i" represents a left rotate or "circular shift" of a 32-bit value by i-bits. For example, B<<<18 represents a left rotate of B by 18 bits.

During encryption, the round function (F) as represented by Equation 1 (e.g., including the mixer-substitution function T(x) having the non-linear substitution function τ(x) given by Equation 3 and the linear substitution function L(B) given by Equation 5) may be performed during each of thirty-two rounds (i=0, 1, . . . 31). After these thirty-two rounds, the encrypted or ciphertext value of the plaintext 128-bit input block ($X_0$, $X_1$, $X_2$, $X_3$) may be designated as ($Y_0$, $Y_1$, $Y_2$, $Y_3$). ($Y_0$, $Y_1$, $Y_2$, $Y_3$) is equal to the reverse substitution of ($X_{32}$, $X_{33}$, $X_{34}$, $X_{35}$) which may be designated as ($X_{35}$, $X_{34}$, $X_{33}$, $X_{32}$).

During decryption, a block may be decrypted by using the same round function (F) represented by Equation 1 (e.g., including the mixer-substitution function T(x) having the non-linear substitution function τ(x) given by Equation 3 and the linear substitution function L(B) given by Equation 5) but reversing the order in which the round keys ($rk_i$) are used. That is, the algorithm's encryption and decryption perform substantially the same operations, except that the order in which the round keys are used is reversed. For example, the key order for encryption may be first $rk_0$, then $rk_1$, . . . , and finally $rk_{31}$, whereas the key order for decryption may be first $rk_{31}$, then $rk_{30}$, . . . , and finally $rk_0$.

Thirty-two round keys ($rk_0$, $rk_1$, $rk_{31}$) may be generated from a 128-bit encryption key "MK", a 128 bit system parameter "FK", and thirty-two key generation constants ($CK_0$, $CK_1$, . . . $CK_{31}$) defined by the algorithm. The 128-bit encryption key MK may be represented as four 32-bit segments ($MK_0$, $MK_1$, $MK_2$, $MK_3$). The system parameter FK may be represented as four 32-bit system parameter segments ($FK_0$, $FK_1$, $FK_2$, $FK_3$). In hexadecimal notation, these system parameter segments may be $FK_0$=(a3b1bac6), $FK_1$=(56aa3350), $FK_2$=(677d9197), and $FK_3$=(b27022dc). Initially, four 32-bit segments ($K_0$, $K_1$, $K_2$, $K_3$) may be calculated according to Equation 6:

$$(K_0,K_1,K_2,K_3)=(MK_0 XOR\ FK_0, MK_1 XOR\ FK_1, \\ MK_2 XOR\ FK_2, MK_3 XOR\ FK_3) \quad \text{Equation 6}$$

The thirty-two round keys ($rk_i$) may be generated according to the key expansion round function (F') represented by Equation 7:

$$\begin{aligned} rk_i &= K_{i+4} \\ &= F'(K_i, K_{i+1}, K_{i+2}, K_{i+3}, CK_i) \\ &= K_i XOR\ T'(K_{i+1} XOR K_{i+2} XOR K_{i+3} XOR CK_i) \end{aligned} \quad \text{Equation 7}$$

Equation 7 may be evaluated once to generate a single result of one round of key expansion (e.g., a round key $rk_i$). The key expansion round function (F') of Equation 7 is similar to the cipher round function (F) of Equation 1. One exception is that the key expansion round function (F') of Equation 7 has a slightly different mixer-substitution function T' (x) than the mixer-substitution function T(x) of the cipher round function (F) of Equation 1. In particular, the key expansion mixer-substitution function T' (x) uses a key expansion linear substitution function L'(B) that is different than the cipher linear substitution function L(B) of Equation 5. The key expansion linear substitution function L'(B) is shown in Equation 8:

$$L'(B)=B\ XOR(B<<<13)XOR(B<<<23) \quad \text{Equation 8}$$

As can be seen, by comparing Equation 5 with Equation 8, the key expansion linear substitution function L'(B) uses different rotation amounts, has two fewer XOR operations, and has two fewer rotation operations, as compared to the cipher linear substitution function L(B) of Equation 5.

FIG. 1 illustrates an embodiment of the present invention in SMS4 acceleration hardware 100. SMS4 acceleration hardware 100 includes cipher hardware 110 to perform rounds of encryption and/or decryption and key expansion hardware 120 to generate round keys. The datapath of cipher hardware 110 and the datapath of key expansion hardware 120, though similar, are separate to provide for a cipher round and a key expansion round to be performed concurrently.

In each round of encryption, the cipher hardware 110 processes four 32 bit words designated X0, X1, X2, and X3, and a 32 bit round key RKi. The XOR of X1, X2, X3, and RKi forms a 32 bit result that is transformed into another 32 bit word using four 8 bit SBOXs. The SBOX output then passes through a Linear Transform and then is XORed with input X0 producing X4 for the next round. X1, X2, and X3 are shifted down to X0, X1, and X2 for the next round, with the next key input being RKi+1. Key expansion hardware 120 uses a datapath that is similar to that of cipher hardware 110; with differences including: processing of the SBOX output with an L' transform instead of an L transform, and receiving an input from a CK register (which is loaded from a 32 entry table CKi, from i=0 to i=31) instead of from an RK register.

SMS4 acceleration hardware 100 provides for encryption to be performed in 33 clock cycles, where only key expansion hardware 120 executes in the first cycle, followed by 31 cycles in which cipher hardware 110 executes using the round key generated in the previous cycle while key expansion hardware 120 generates a round key for the next cycle, followed by a 33$^{rd}$ cycle for the 32$^{nd}$ round of encryption.

Figure 2:
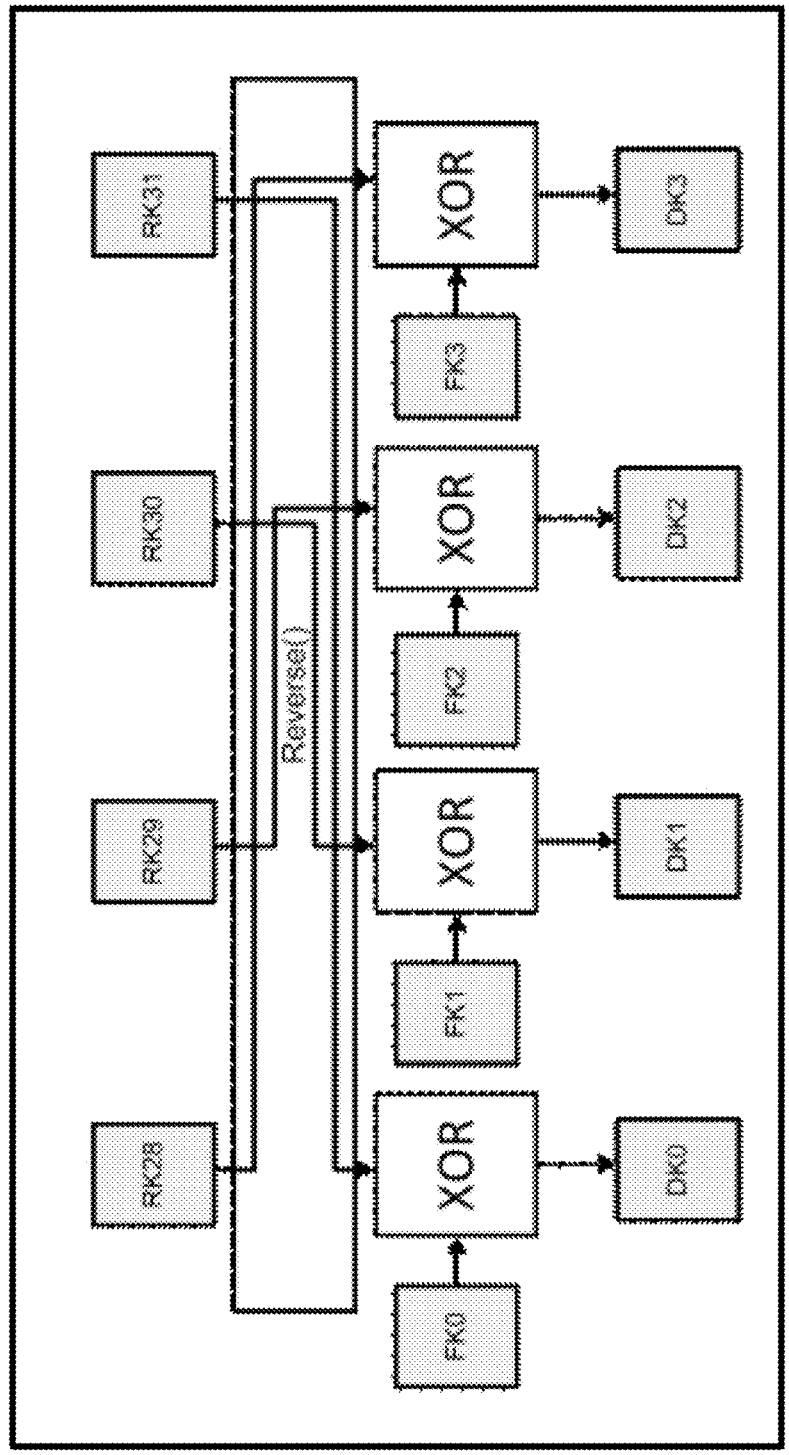
FIG. 2 illustrates an embodiment of the present invention in key transformation hardware.

FIG. 2 illustrates an embodiment of the present invention in key transformation hardware 200, which provides for SMS4 acceleration hardware 100 to be used to perform decryption in addition to encryption. Key transformation hardware 200 is to perform post processing of the 128 bit output RK28, RK29, RK30, and RK31 during the 32$^{nd}$ cycle of operation of SMS4 acceleration hardware 100. The post processing includes endian reversing the 128 bit input value and XORing the result with the FK system variables (DK0=RK31 XOR FK0, DK1=RK30 XOR FK1, DK2=RK29 XOR FK2, DK3=RK28 XOR FK3). The XOR with the FK system parameter in key transformation hardware 200 allows decryption key DK to be used as an input to key expansion hardware 120 (instead of encryption key EK) by cancelling out the XOR with FK that is applied to the EK input.

The decryption round keys are generated using the CK table in reverse order (CKi from i=31 to i=0). Also, the interface from key expansion hardware 120 to cipher hardware 110 is slightly different for encryption and decryption. For encryption, the result from the final XOR gate in the datapath of key expansion hardware 120 is latched into the RK register for use by cipher hardware 110 in the next cycle of every round. However, for the initial round of decryption, the value in the K0 register is latched into the RK register, which is provided for by multiplexer 122. Therefore, decryption may be performed in 32 clock cycles, instead of the 33 cycles used for encryption, because the initial decryption round key is already available for the initial round of decryption.

In an alternative embodiment of the present invention, SMS4 acceleration hardware 100 may be implemented without multiplexer 122. In this embodiment, key expansion hardware 120 is operated for four additional cycles at the end of encryption. Therefore, four extra round keys, RK32, RK33, RK34, and RK35 are generated. By using these four round keys are used as inputs to key transformation hardware 200 instead of RK28, RK29, RK30, and RK31, the datapath through key expansion hardware 120 for all 32 rounds of decryption is identical to the datapath for all 32 rounds of encryption (i.e., multiplexer 122 is not needed and may be eliminated). Since the first of these four extra rounds of key expansion may be overlapped with the last round of encryption, only three extra clock cycles are added, and they are added only when encryption is followed by decryption.

Figure 3:
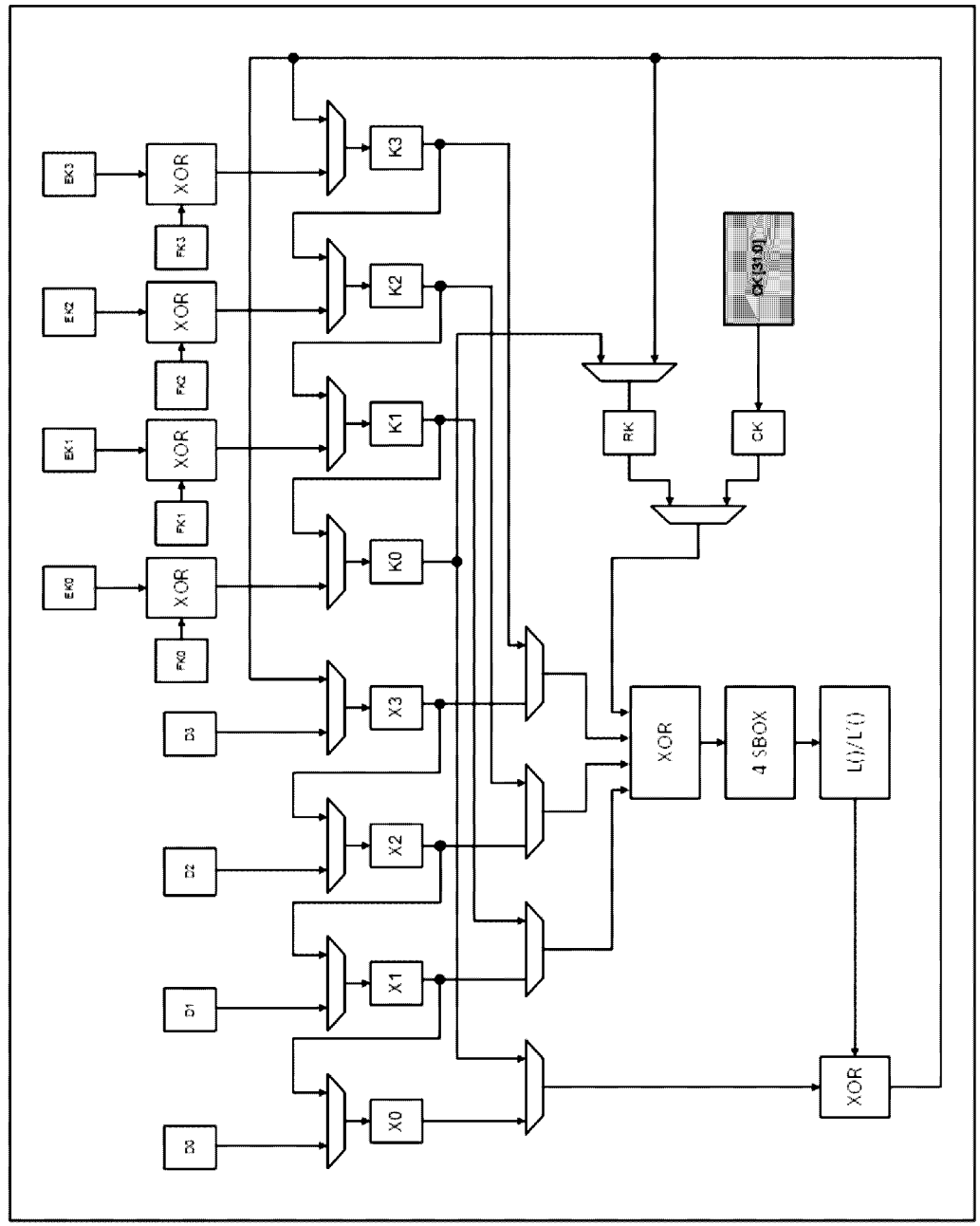
FIG. 3 illustrates an alternative embodiment of the present invention in SMS4 acceleration hardware.

FIG. 3 illustrates an alternative embodiment of the present invention in SMS4 acceleration hardware 300. The similarity between cipher hardware 110 and key expansion hardware 120 described above provides for acceleration hardware 300 to use the same datapath for cipher and key expansion, thereby reducing the area used for the SMS4 circuitry.

In SMS4 acceleration hardware 300, the 4×32 bit XOR and 4×8 bit SBOX hardware is the same for both cipher and key expansion. The output of the SBOX hardware is input to both a L and L' circuit, with L being selected for cipher cycles, and L' being selected for key expansion cycles. Having the cipher and key expansion share a single SBOX circuit is a significant area optimization, the tradeoff being 64 cycles for encryption versus 33 cycles with the separate cipher and key expansion hardware in the embodiment shown in FIG. 1.

The decryption key may be generated using RK28 to RK31. This implementation provides for decryption in 60 cycles, 32 for cipher and 28 for key expansion, since the first four round keys would be readily available. In this embodiment, for the first 56 cycles, the key and cipher registers are clocked on alternate cycles, while for the final four cycles, only the cipher registers are enabled.

Figure 4:
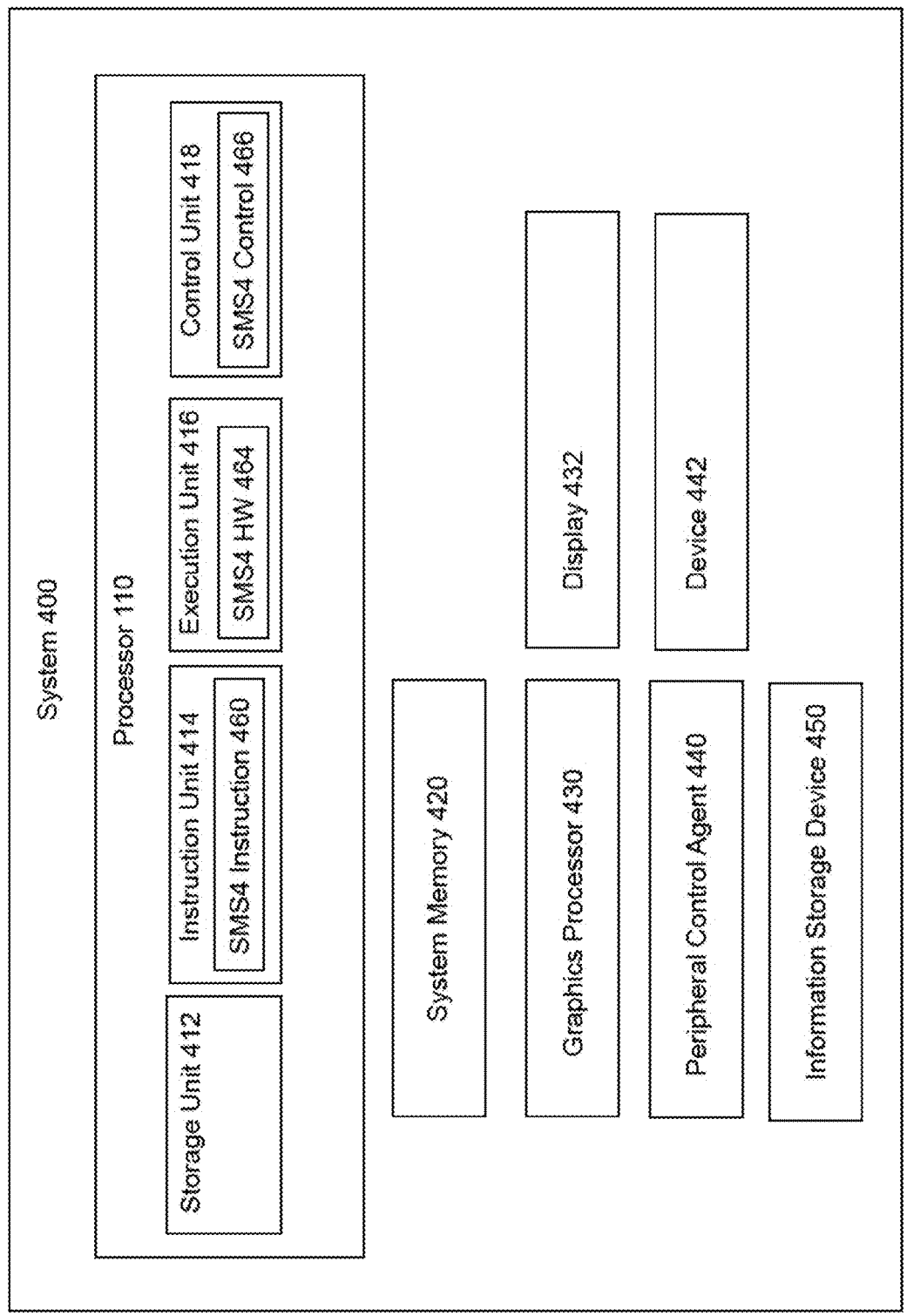
FIG. 4 illustrates an embodiment of the present invention in a processor in an information processing system.

The present invention may also be embodied in a processor or other apparatus and/or an information processing or other system. For example, FIG. 4 illustrates an embodiment of the present invention in processor 410 in information processing system 400. System 400 may represent any type of information processing system, such as a server, a desktop computer, a portable computer, a set-top box, a hand-held device such as a tablet or a smart phone, or an embedded control system.

System 400 includes processor 410, system memory 420, graphics processor 430, peripheral control agent 440, and information storage device 450. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 400, whether shown in FIG. 4 or not shown in FIG. 4, may be integrated or otherwise included on or in a single chip (a system-on-a-chip or SOC), die, substrate, or package.

System memory 420 may be dynamic random access memory or any other type of medium readable by processor 410. Graphics processor 430 may include any processor or other component for processing graphics data for display 432. Peripheral control agent 440 may represent any component, such as a chipset component, including or through which peripheral, input/output (I/O), or other components or devices, such as device 442 (e.g., a touchscreen, keyboard, microphone, speaker, other audio device, camera, video or other media device, network adapter, motion or other sensor, receiver for global positioning or other information, etc.) and/or information storage device 450, may be connected or coupled to processor 410. Information storage device 450 may include any type of persistent or non-volatile memory or storage, such as a flash memory and/or a solid state, magnetic, or optical disk drive.

Processor 410 may represent one or more processors or processor cores integrated on a single substrate or packaged within a single package, each of which may include multiple threads and/or multiple execution cores, in any combination. Each processor represented as or in processor 410 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented.

Processor 410 may include storage unit 412, instruction unit 414, execution unit 416, and control unit 418, each as described below. Processor 410 may also include any other circuitry, structures, or logic not shown in FIG. 4. Furthermore, the functionality and or circuitry of each of the described and/or illustrated units of processor 410 may be combined and/or distributed in any manner.

Storage unit 412 may include any combination of any type of storage usable for any purpose within processor 410; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 410, as well as circuitry usable to access such storage.

Instruction unit 414 may include any circuitry, logic, structures, and/or other hardware, such as an instruction decoder, to fetch, receive, decode, interpret, schedule, and/or handle instructions to be executed by processor 410, including one or more instructions to execute an SMS4 algorithm or a portion of an SMS4 algorithm, as represented by SMS4 instruction 460. Any instruction format may be used within the scope of the present invention; for example, an instruction may include an opcode and one or more operands, where the opcode may be decoded into one or more micro-instructions or micro-operations for execution by execution unit 416. Operands or other parameters may be associated with an instruction implicitly, directly, indirectly, or according to any other approach.

Execution unit 416 may include any circuitry, logic, structures, and/or other hardware, such as arithmetic units, logic units, floating point units, shifters, etc., to process data and execute instructions, micro-instructions, and/or micro-operations. Execution unit 416 may represent any one or more physically or logically distinct execution units. Execution unit 416 may include SMS4 acceleration hardware 462 according to an embodiment of the present invention such as SMS4 acceleration hardware 100 as illustrated in FIG. 1, key transformation hardware 200 as illustrated in FIG. 2, SMS4 acceleration hardware 300 as illustrated in FIG. 3, and/or any other hardware according to an embodiment of the present invention.

Control unit 418 may include any microcode, firmware, circuitry, logic, structures, and/or hardware to control the operation of the units and other elements of processor 410 and the transfer of data within, into, and out of processor 410. Control unit 418 may include SMS4 control logic 464 which may control the operation of SMS4 acceleration hardware 462 according to embodiments of the present invention, and/or cause processor 410 to perform or participate in method embodiments of the present invention.

Figure 5:
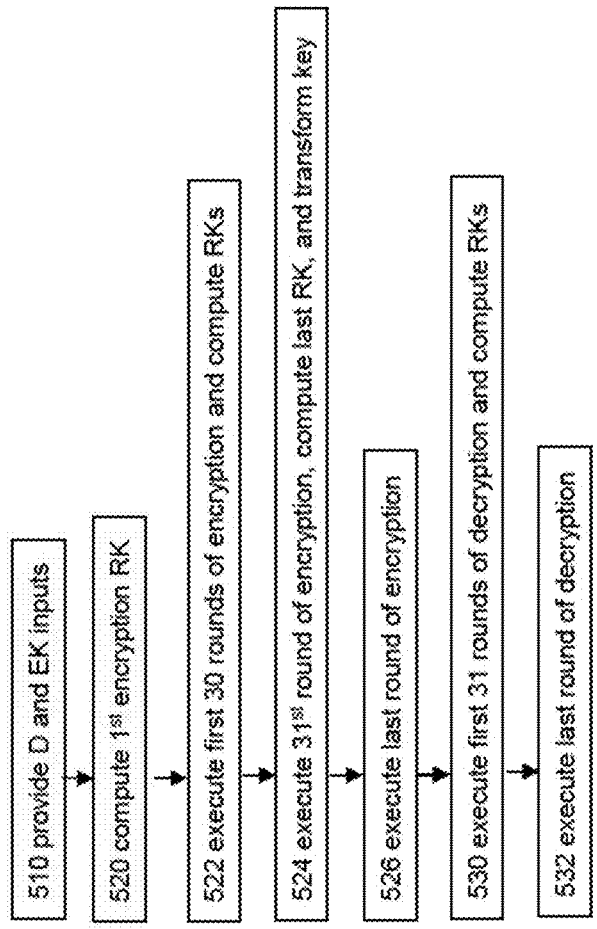

The present invention may also be embodied in a method. For example, FIGS. 5, 6, and 7 illustrate methods 500, 600, and 700 for performing an SMS4 cryptographic algorithm according to embodiments of the present invention. Although method embodiments of the invention are not limited in this respect, reference may be made to elements of FIGS. 1, 2, 3, and/or 4 to help describe the method embodiments of FIGS. 5, 6, and 7. Various portions of methods 500, 600, and 700 may be performed by hardware, firmware, software, and/or a user of a system. Note that each box of these methods may represent one or more clock cycles in an execution pipeline.

In box 510 of method 500, an input D and a key EK is provided to SMS4 acceleration hardware (e.g., SMS4 acceleration hardware 100).

In box 520, during a first clock cycle of operation of the SMS4 acceleration hardware, a first encryption round key is computed (e.g., by key expansion hardware 120). In box 522, during a $2^{nd}$ through a $31^{st}$ clock cycle, a first 30 rounds (e.g., one round per clock cycle) of an SMS4 encryption algorithm are executed (e.g., by cipher hardware 110), each using an encryption round key generated during the previous clock cycle, and an encryption round key for the next round is generated (e.g., by key expansion hardware 120).

In box 524, during a $32^{nd}$ clock cycle, a $31^{st}$ round of encryption is performed (e.g., by cipher hardware 110) using an encryption round key generated during the previous clock cycle, an encryption round key for the next round is generated (e.g., by key expansion hardware 120, and a key formed from RK28, RK29, RK30, and RK31 is transformed to be used as a decryption key (e.g., by key transformation hardware 200). In box 526, during a $33^{rd}$ clock cycle, a $32^{nd}$ round of encryption is performed (e.g., by cipher hardware 110) using an encryption round key generated during the previous clock cycle.

In box 530, during a $34^{th}$ through a $64^{th}$ clock cycle, a first 31 rounds (e.g., one round per clock cycle) of an SMS4 decryption algorithm are executed (e.g., by cipher hardware 110), each using a decryption round key generated or made available during the previous clock cycle, and a decryption round key for the next round is generated (e.g., by key expansion hardware 120). In box 532, during a $65^{th}$ clock cycle, a $32^{nd}$ round of decryption is performed (e.g., by cipher hardware 110) using a decryption round key generated during the previous clock cycle.

In box 610 of method 600, an input D and a key EK is provided to SMS4 acceleration hardware (e.g., SMS4 acceleration hardware 100 without multiplexer 122).

In box 620, during a first clock cycle of operation of the SMS4 acceleration hardware, a first encryption round key is computed (e.g., by key expansion hardware 120). In box 622, during a $2^{nd}$ through a $32^{nd}$ clock cycle, a first 31 rounds (e.g., one round per clock cycle) of an SMS4 encryption algorithm are executed (e.g., by cipher hardware 110), each using an encryption round key generated during the previous clock cycle, and an encryption round key for the next round is generated (e.g., by key expansion hardware 120).

In box 624, during a $33^{rd}$ clock cycle, a $32^{nd}$ round of encryption is performed (e.g., by cipher hardware 110) using an encryption round key generated during the previous clock cycle, and an extra encryption round key (e.g., RK32) is generated (e.g., by key expansion hardware 120). In box 626, during a $34^{th}$ through a $36^{th}$ clock cycle, three extra encryption round keys (e.g., RK33, RK34, and RK35, one per clock cycle) are generated (e.g., by key expansion hardware 120), and a key formed from RK32, RK33, RK34, and RK35 is transformed to be used as a decryption key (e.g., by key transformation hardware 200).

In box 630, during a $37^{th}$ through a $67^{th}$ clock cycle, a first 31 rounds (e.g., one round per clock cycle) of an SMS4 decryption algorithm are executed (e.g., by cipher hardware 110), each using a decryption round key generated or made available during the previous clock cycle, and a decryption round key for the next round is generated (e.g., by key expansion hardware 120). In box 632, during a $68^{th}$ clock cycle, a $32^{nd}$ round of decryption is performed (e.g., by cipher hardware 110) using a decryption round key generated during the previous clock cycle.

In box 710 of method 700, an input D and a key EK is provided to SMS4 acceleration hardware (e.g., SMS4 acceleration hardware 300).

In box 720, during a $1^{st}$ through a $64^{th}$ clock cycle of operation of the SMS4 acceleration hardware, an encryption round key is computed during the odd cycles and a round of an SMS4 encryption algorithm is executed during the even cycles using an encryption round key generated during the previous clock cycle.

In box 722, during a $65^{th}$ clock cycle through a $120^{th}$ clock cycle, a decryption round key is computed during the odd cycles and a round of an SMS4 decryption algorithm is executed during the even cycles using a decryption round key generated during a previous clock cycle. In box 724, during a 121$^{st}$ through a 124$^{th}$ clock cycle, a round of an SMS4 decryption algorithm is executed using a decryption round key generated during a previous clock cycle.

In various embodiments of the present invention, the methods illustrated in FIGS. 5, 6, and 7 may be performed in a different order, with illustrated boxes combined or omitted, with additional boxes added, or with a combination of reordered, combined, omitted, or additional boxes. Furthermore, method embodiments of the present invention are not limited to methods 500, 600, 700, or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of methods 500, 600, and/or 700 may be embodied in software or firmware instructions that are stored on a medium readable by processor 410, which when executed by processor 410, cause processor 410 to execute an embodiment of the present invention. Also, aspects of the present invention may be embodied in data stored on a machine-readable medium, where the data represents a design or other information usable to fabricate all or part of processor 410.

Thus, embodiments of an invention for SMS4 acceleration hardware have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

The invention claimed is:

1. An apparatus comprising:
   SMS4 acceleration hardware to execute a round of encryption and a round of key expansion; and
   key transformation hardware to transform an encryption round key into a different decryption round key to provide for the SMS4 acceleration hardware to execute a round of decryption according to a SMS4 cryptographic algorithm.

2. The apparatus of claim 1, including a first datapath for the round of encryption and a second datapath for the round of key expansion.

3. The apparatus of claim 2, wherein the round of encryption and the round of key expansion are executed concurrently.

4. The apparatus of claim 3, wherein the round of encryption uses a round key generated during a previous round of key expansion.

5. The apparatus of claim 1, including a shared datapath for the round of encryption and the round of key expansion.

6. The apparatus of claim 5, wherein the round of encryption and the round of key expansion are executed in alternate clock cycles.

7. The apparatus of claim 6, wherein the round of encryption uses a round key generated during a previous round of key expansion.

8. The apparatus of claim 1, including a multiplexer to select a first decryption round key from a first input and a second through a thirty-second decryption round key from a second input.

9. The apparatus of claim 8, wherein the multiplexer is also to select a first through a thirty-second encryption round key from the second input.

10. The apparatus of claim 1, including a shared datapath for a first through a thirty-second decryption round keys and a first through a thirty-second encryption round key.

11. The apparatus of claim 1, wherein the key transformation hardware is to endian reverse a twenty-ninth through a thirty-second encryption round key to generate an intermediate result.

12. The apparatus of claim 11, wherein the key transformation hardware is also to perform an XOR operation on the intermediate result and a system parameter.

13. The apparatus of claim 1, wherein the key transformation hardware is to endian reverse a thirty-third through a thirty-sixth encryption round key to generate an intermediate result.

14. The apparatus of claim 13, wherein the key transformation hardware is also to perform an XOR operation on the intermediate result and a system parameter.

15. A method comprising:
   executing a round of SMS4 encryption using SMS4 acceleration hardware;
   executing a round of key expansion using the SMS4 acceleration hardware;
   transforming an encryption round key to a different decryption round key to provide for executing a round of SMS4 decryption using the SMS4 acceleration hardware according to a SMS4 cryptographic algorithm.

16. The apparatus of claim 15, wherein the round of SMS4 encryption and the round of key expansion are executed concurrently.

17. The method of claim 15, wherein the round of encryption and the round of key expansion are executed in alternate clock cycles.

18. The method of claim 15, wherein transforming the encryption round key include endian reversing four encryption round keys to generate an intermediate result.

19. The method of claim 18, wherein transforming the encryption round key also includes performing an XOR operation on the intermediate result and a system parameter.

20. A processor device comprising:
   instruction hardware to receive an SMS4 instruction; and
   execution hardware to execute the SMS4 instruction, the execution hardware including:
   SMS4 acceleration hardware to execute a round of encryption and a round of key expansion, and key transformation hardware to transform an encryption round key to generate a different decryption round key to provide for the SMS4 acceleration hardware to execute a round of decryption according to a SMS4 cryptographic algorithm.

* * * * *